United States Patent
Yamane et al.

(10) Patent No.: US 6,852,827 B2
(45) Date of Patent: Feb. 8, 2005

(54) POLYESTER PRODUCTION PROCESS AND REACTOR APPARATUS

(75) Inventors: Kazuyuki Yamane, Fukushima (JP);
Yukichika Kawakami, Fukushima (JP);
Hiroyuki Sato, Fukushima (JP);
Tomohiro Hoshi, Fukushima (JP)

(73) Assignee: Kureha Chemical Industry Company, Limited, Tokyo (JP)

( * ) Notice: Subject to any disclaimer, the term of this patent is extended or adjusted under 35 U.S.C. 154(b) by 0 days.

(21) Appl. No.: 10/476,117

(22) PCT Filed: Jul. 5, 2002

(86) PCT No.: PCT/JP02/06836
§ 371 (c)(1),
(2), (4) Date: Oct. 27, 2003

(87) PCT Pub. No.: WO03/006526
PCT Pub. Date: Jan. 23, 2003

(65) Prior Publication Data
US 2004/0230026 A1 Nov. 18, 2004

(30) Foreign Application Priority Data
Jul. 10, 2001 (JP) .................................. 2001-208806

(51) Int. Cl.[7] ............................................. C08G 63/02
(52) U.S. Cl. ..................... 528/272; 422/131; 526/62; 528/271
(58) Field of Search .......................... 422/131; 526/62; 528/271, 272

(56) References Cited

U.S. PATENT DOCUMENTS

| | | |
|---|---|---|
| 2,668,162 A | 2/1954 | Lowe |
| 3,297,033 A | 1/1967 | Schmitt et al. |
| 5,378,801 A | 1/1995 | Reichert et al. |
| 5,440,008 A | 8/1995 | Fumiaki et al. |

FOREIGN PATENT DOCUMENTS

| | | |
|---|---|---|
| JP | 60-144325 | 7/1985 |
| JP | 3-502115 | 5/1991 |
| JP | 7-026001 | 1/1995 |
| JP | 7-053684 | 2/1995 |
| JP | 9-328481 | 12/1997 |
| JP | 2000119269 | 4/2000 |

OTHER PUBLICATIONS

Chujo et al, *Die Makromolekulare Chemie 100*, 262–266 (1967).

*Primary Examiner*—Terressa Boykin
(74) *Attorney, Agent, or Firm*—Dinsmore & Shohl LLP

(57) ABSTRACT

The invention provides a polyester production process by bulk polymerization in a reactor, wherein the volume of the resulting polyester is shrunk for a release from the inner surface of the reactor, so that the polyester can be recovered in the form of a bulky mass. The invention also provides a reactor for bulk polymerization for polyester, which comprises an inner surface that enabling the resulting polyester to be released therefrom upon its volume shrinkage.

24 Claims, No Drawings

POLYESTER PRODUCTION PROCESS AND REACTOR APPARATUS

TECHNICAL FIELD

The present invention relates generally to a polyester production process, and more particularly to a process for the production of polyesters by bulk polymerization in a reactor, which enables the polyester product to be easily recovered in a bulky mass form after the completion of polymerization reaction. The present invention is also directed to a reactor apparatus for the bulk polymerization for polyesters, which is suited for use with such a polyester production process.

The inventive production process and apparatus disclosed herein lend themselves to the production of crystalline, biodegradable aliphatic polyesters such as polyglycolic acid.

BACKGROUND ART

Polyesters such as polyglycolic acid have often been produced by bulk polymerization. In batch manners, however, it has sometimes been difficult to take and recover polyester products out of a reactor apparatus after the completion of polymerization reactions. This is now explained more specifically with reference to polyglycolic acid as an example.

As can be seen from the following formula (1):

[I]

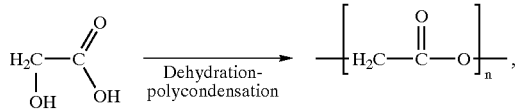

polyglycolic acid may be synthesized through the de-hydration-polycondensation of glycolic acid.

Polyglycolic acid may also be synthesized through the dealcoholization-polycondensation of an alkyl ester of polyglycolic acid, as can be noted from the following reaction scheme (II):

[II]

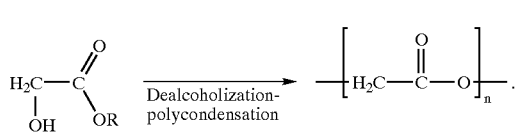

Here R is an alkyl group that has preferably about 1 to 5 carbon atoms.

Moreover, polyglycolic acid may be synthesized by the ring-opening polymerization of glycolide that is a bimolecular cyclic ester of glycolic acid or, alternately, called a "cyclic dimer" according to the following scheme (III):

[III]

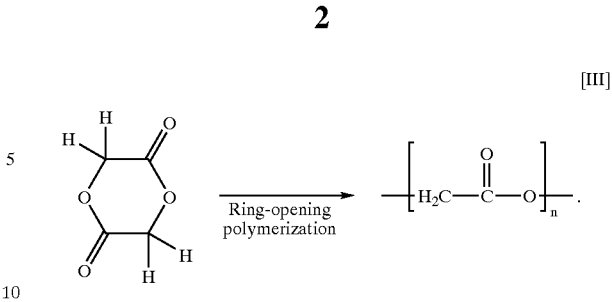

The glycolic acid synthesized by the ring-opening polymerization of glycolide is sometimes referred to as polyglycolide.

The polyglycolic acid (or polyglycolide) formed through these polymerization reactions is usually synthesized by bulk polymerization because of being only soluble in a specific solvent such as hexafluoroiso-propanol. The bulk polymerization is usually carried out by two production processes, i.e., a continuous process and a batch process.

Japanese Patent Laid-Open No. (JP-A) 03-502115 discloses a process wherein bulk polymerization for cyclic esters is carried out in a twine-screw extruder.

JP-A 07-26001 discloses a process for the polymerization for biodegradable polyester-based polymers, wherein a bimolecular cyclic ester of hydroxycarboxylic acid and one or more lactones are continuously fed to a continuous reaction apparatus having a static mixer for ring-opening polymerization.

JP-A 07-53684 discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader.

These continuous production processes are well suitable for the mass production of polyesters such as polylactic acid or polyglycolic acid, but they are not suitable for cases where the volume of production is low and there are a wide variety of products to be produced. There is also demand for polyesters such as polyglycolic acids having various molecular weights and copolymers of glycolic acid with other comonomers, which are to be produced in the small amount and large variety.

Generally, batch processes rather than continuous ones lend themselves to flexible production of polyesters. When bulk polymerization is carried out in a reactor in a batch production fashion, however, it is difficult to remove the resulting polyglycolic acid out of the reactor, because its viscosity is high enough to show stickiness in its molten state.

For instance, U.S. Pat. No. 2,668,162 shows in Example 3 that glycolide is heated in a tubular reaction vessel, thereby obtaining a polymer. In this case, however, scraping, extrusion, pumping or other means should be used to discharge the resulting polymer from the tubular reaction vessel in a troublesome, time-consuming manner. In addition, there is another need for removal of the remaining polymer deposited onto the inner wall of the reaction vessel. Example 4 refers to an experimental example wherein the reaction of glycolide and lactide is effected with the application of heat in the reaction vessel; however, this example reveals that after 1 hour, the stirring operation is stopped because the reaction product is too viscous. It is not easy to remove such a viscous reaction product from the stirrer. To discharge the resulting polymer from the reactor, it should be first solidified by cooling and then pulverized.

U.S. Pat. No. 3,297,033 describes that a mixture of glycolide with a polymerization catalyst is heated in a separate glass tube for polymerization and the product is then cooled to obtain a polymer (see Example 1). However, the resulting polyglycolic acid has a high melting viscosity and stickiness to the glass surface, and so cannot easily be removed out of the glass tube even upon cooling. When the resulting polyglycolic acid is removed by cooling it and breaking the glass tube, glass pieces stick to a bulky form of polyglycolic acid. In this case, some operation is needed for removal of glass pieces from polyglycolic acid. This operation itself is troublesome, and the yield of polymer recovery drops as well.

According to one possible approach, the resulting polyester is heated for its removal from the reactor in a molten state. However, when the polyester is too viscous, it is required to elevate the heating temperature. This renders undesired reactions such as decomposition and discoloration of the polyester likely to occur. The polyester in a molten state is hard to handle. Even with this approach, it is still difficult to prevent deposition of some polyester to the wall of the reactor, the stirrer, etc.

DISCLOSURE OF THE INVENTION

One object of the present invention is to provide a polyester production process by bulk polymerization in a reactor apparatus, which enables the resulting polyester to be readily recovered in a bulky form after the completion of polymerization reactions.

Another object of the present invention is to provide a polyester bulk polymerization reactor apparatus best suited for such a polyester production process.

As a result of intensive studies made to accomplish the aforesaid objects, the inventors have figured out a process wherein a reactor apparatus having an inner surface enabling the resulting polymer to be released upon its volume shrinkage is used to produce a polyester by bulk polymerization, and the volume of the resulting polyester is shrunk to release the polyester from the inner surface of the reactor, so that the polyester can be recovered as a bulky mass from the reactor.

According to the production process of the present invention, it is possible to make use of the releasability of the resulting polyester from the inner surface of the reactor so that the polyester can be produced by simple means yet at high recovery yield. Accordingly, the production process and system of the present invention are suitable for cases where the polyester is produced in the small amount and large variety by bulk polymerization. These findings have underlain the present invention.

Thus, the present invention provides a process for the production of a polyester by bulk polymerization in a reactor apparatus, characterized in that the volume of the resulting polyester is shrunk to release the polyester from the inner surface of the reactor, so that the polyester can be recovered in a bulky form from the reactor.

The present invention also provides a polyester bulk polymerization reactor apparatus capable of being heated from outside and formed of a material having heat resistance enough to stand up to the bulk polymerization temperature for polyesters, and comprises an inner surface that enables the resulting polyester to be released upon its volume shrinkage.

BEST MODE FOR CARRYING OUT THE INVENTION

1. Polyesters

The polyesters used herein, for instance, include polycondensates of dicarboxylic acids and diols, polycondensates of hydroxycarboxylic acids, polycondensates of alkyl esters of hydroxycarboxylic acids, and ring-opening polymers of cyclic esters. These may be in the form of either homopolymers or copolymers (copolyesters).

Aliphatic polyesters are preferred for the polyesters in view of biodegradability, and preferred aliphatic polyesters include a polyhydroxycarboxylic acid. The polyhydroxycarboxylic acid may be synthesized in the form of a polycondensate of a hydroxycarboxylic acid or an alkyl ester of hydroxycarboxylic acid. The polyhydroxycarboxylic acid may also be synthesized in the form of a ring-opening polymer of a cyclic diester (cyclic dimer) of hydroxycarboxylic acids.

The hydroxycarboxylic acids used herein, for instance, include glycolic acid, L-lactic acid, D-lactic acid, α-hydroxybutyric acid, α-hydroxyisobutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid and α-hydroxystearic acid, which may have been substituted by alkyls.

The alkyl esters of hydroxycarboxylic acids are the esters of these hydroxycarboxylic acids and alcohols. Although salts (e.g., Na salts) of hydroxycarboxylic acids may be used, it is noted that during bulk polymerization, byproducts are likely to occur by way of desalting reactions. Of these, glycolic acid and lactic acids as well as their alkyl esters are preferred although glycolic acid and its alkyl esters are more preferred.

Of the cyclic esters, preference is given to glycolide that is the cyclic diesters of glycolic acids and L-lactide and D-lactide that are the cyclic diesters of lactic acids, although glycolide is particularly referred. The ring-opening polymerization of glycolide gives polyglycolic acid, and the ring-opening polymerization of lactides gives polylactic acids. Glycolide may be copolymerized with lactides.

Although no particular limitation is imposed on how to produce glycolide, it is understood that glycolide may generally be obtained by the thermal depolymerization of glycolic acid oligomers. For the depolymerization processes for glycolic acid oligomers, for instance, use may be made of a molten depolymerization process such as one set forth in U.S. Pat. No. 2,668,162, a solid-phase depolymerization process such as one set forth in JP-A 2000-119269, and a solution depolymerization process such as one set forth in JP-A 09-328481. Use may also be made of glycolide obtained in the form of a cyclic condensate of chloroacetic acid salt, as reported by K. Chujo et al. in Die Makromoleculare Cheme, 100(1967), pp. 262–266.

Glycolide and lactide may be independently a ring-opening polymer or they may be a ring-opening copolymer. Glycolide and lactide may be copolymerized with other comonomers. The comonomers used herein, for instance, include ethylene oxalate (i.e., 1,4-dioxane-2,3-dione), lactones (e.g., β-propiolactone, β-butyrolactone, pivalolactone, γ-butyrolactone, δ-valerolactone, β-methyl-δ-valerolactone, and ε-caprolactone), cyclic monomers such as trimethylene carbonate and 1,3-dioxane; hydroxy-carboxylic acids such as lactic acid, 3-hydroxypropanoic acid, 3-hydroxybutanoic acid, 4-hydroxybutanoic acid and 6-hydroxycaproic acid or their alkyl esters; and substantially equimolar mixtures of aliphatic diols such as ethylene glycol and 1,4-butanediol and aliphatic dicarboxylic acids such as succinic acid and adipic acid or their alkyl esters. These may be used in combination of two or more.

Of these comonomers, preference is given to lactones, cyclic compounds such as trimethylene carbonate, and hydroxycarboxylic acids such as lactic acid and glycolic acid, because they are easily copolymerizable and enable copolymers having improved physical properties to be easily obtained.

The comonomer(s) should be used in an amount of not more than 50% by weight, preferably not more than 45% by weight, more preferably not more than 30% by weight, and even more preferably not more than 10% by weight of all the charged monomers. By copolymerization, for instance, it is possible to lower the melting point and, hence, processing temperature of polyglycolic acid, and control the crystallization temperature thereof, thereby improving the processability thereof on extrusion or stretching.

Of a variety of polyesters, particular preference is given to polyglycolic acid because a crystalline polymer having a high molecular weight (high melting viscosity) can be readily obtained by bulk polymerization. This polyglycolic acid should preferably be synthesized by the polycondensation of glycolic acid or an alkyl ester of glycolic acid or the ring-opening polymerization of glycolide.

As already mentioned, the polyglycolic acid may be a homopolymer; however, it may be a copolymer (copolyester) with other comonomer(s) provided that its crystallinity be not largely affected. The copolymer should contain polyglycolic acid in an amount of at least 50% by weight, preferably at least 55% by weight, and more preferably at least 70% by weight. As the content of polyglycolic acid repeating units in the copolymer becomes too low, the crystallization properties of the copolymer becomes low, and so long time is needed for crystallization with decreased crystallinity, resulting in a drop of the ability of the copolymer to be released or discharged from the reactor.

2. Bulk Polymerization

The bulk polymerization according to the present invention may be carried out under the conditions preferable for polyester synthesis. By way of example but not by way of limitation, the polymerization catalysts for polyhydroxycarboxylic acids such as polyglycolic acid include tin base compounds such as tin halides (e.g., tin dichloride and tin tetrachloride) and organic carboxylic acid tin compounds (e.g., tin octanoate); titanium base compounds such as alkoxytitanate: zirconium base compounds such as zirconium acetylacetone, and antimony halides. The amount of the catalyst used is, for example, in the range of preferably 1 to 1,000 ppm, and more preferably 3 to 300 ppm on a weight ratio basis relative to the cyclic ester.

For weight-average molecular weight control, higher alcohols such as lauryl alcohol may be added as a molecular weight control agent. For the purpose of improvements in physical properties, polyhydric alcohols such as glycerin may also be added.

The polymerization temperature may be determined in the range from 120° C. that is a substantial polymerization start temperature to 250° C. More exactly, the polymerization temperature should be in the range of preferably 130 to 240° C., more preferably 140 to 230° C., and even more preferably 150 to 225° C. Too high polymerization temperatures would make the resulting polymer susceptible to thermal decomposition. Although the polymerization temperature may be kept constant during polymerization reactions, it is acceptable to elevate or lower the polymerization temperature in a stepwise manner or a continuous manner, if required.

The polymerization time should be in the range of 3 minutes to 50 hours, and preferably 5 minutes to 30 hours. Too short a polymerization time makes the sufficient progress of polymerization difficult. In some cases, it is difficult to release and discharge the resulting polymer from the inner surface of the reactor even upon solidification by cooling. Too long a polymerization time makes the resulting polymer vulnerable to thermal decomposition.

Usually, the bulk polymerization may be carried out by heating a mixture of a monomer(s) such as glycolic acid or glycolide, a polymerization catalyst(s) and a molecular weight control agent that is added if required. When polycondensation is carried out by dehydration or de-alcoholization as is the case with polyglycolic acid or its alkyl ester, the reaction system should be placed under reduced pressure conditions for removal of water or alcohols therefrom.

3. Reactor Apparatus

The reaction apparatus used herein is a reactor apparatus capable of being heated from outside and formed of a material having heat resistance enough to stand up to the bulk polymerization temperature for polyesters and including an inner surface that enables the resulting polyester to be released upon its volume shrinkage.

A crystalline polyester such as polyglycolic acid is formed in a molten state upon bulk polymerization; however, this polyester is shrunk in volume upon crystallization. The volume of the resulting polyester is also shrunk by cooling. Making use of this volume shrinkage, the polyester is released from the inner surface of the reactor so that it can be readily discharged from the reactor.

Preferably, the reactor should not have asperities that may come into contact with the polyester when it is discharged out of the reactor and so disturb the smooth discharge of the polyester. It is also preferable that there is no stirrer within the reactor. When the molten polyester is deposited onto the asperities or stirrer, some scraping or grounding operation is needed for the recovery of the polyester. This operation is troublesome and time-consuming, and causes the yield of recovery to drop as well.

The inner surface (wall) of the reactor that is to come into contact with the polyester should be formed of a material that enables a polyester such as polyglycolic acid to be readily released therefrom. When the inner surface of the reactor that comes into direct contact with the polyester such as crystallized polyglycolic acid is formed of a metallic material, it has been found that the releasability of the polyester therefrom is improved. When versatile polyesters are produced in small amounts, glass reactors such as glass test tubes are generally used. However, if the inner surface of a reactor is made of a glass material, it is likely to stick to the resulting polyester such as polyglycolic acid.

The materials used to form at least the inner surface of the reactor, for instance, include carbon steel, stainless steel (SUS), titanium, Hastelloy, aluminum, copper, silver, gold, platinum, chromium, nickel and zinc or, their alloys. These metal materials may be formed by plating on the inner surface of the reactor. All things considered inclusive of the processability, cost effectiveness, robustness and corrosion resistance of the reactor, stainless steel (SUS) is believed to be the most effective material.

The surface roughness of the inner part of the reactor is not critical; however, it is preferable to buff the inner surface of the reactor (e.g., with buff No. 300), thereby improving the ability of the resulting polyester to be released and discharged from the reactor.

To improve or enhance the ability of the resulting polyester to be released or discharged from the inner surface of the reactor, it is acceptable to apply a releasing agent thereon or coating a polytetrafluoro-ethylene or other fluoroplastic material layer thereon.

Preferably but not exclusively, the reactor should be configured with a wide opening. For small-batch production, it is preferable to use a metal or other tube open at both ends, or a metal or other tube closed at one end to define a bottom and open at the other end. When a tubular reactor open at both ends is used, at least one opening is closed up with a rubber stopper, etc. Such a tubular reactor is simple in structure and easy to build up and maintain. The tubular reactor used herein may have any desired sectional shapes inclusive of circular, oval or polygonal shape although a tubular reactor of circular shape in section is most preferred.

When the tubular reactor used is of circular shape in section, its size should be preferably 55 mm or smaller for the purpose of reducing variations of the melt viscosity of the resulting polyester, and preferably 30 mm or smaller in view of prevention of discoloration of the resulting polyester. This size is that of the shortest side when the tubular reactor is of oval, polygonal or other shape. To ensure easy removal of a bulky form of polyester product, the size of sectional shape should be preferably 10 mm or greater, and more preferably 20 mm or greater.

The tubular reactor should preferably have a tapered structure because the discharge of the resulting polyester can be more easily achieved. The tapered structure should then preferably have a gradient in the range of 1 to 50%. With a gradient of less than 1%, any taper effect is not obtained, and with a gradient of greater than 50%, the discharge or handling of the resulting polyester often becomes difficult. The resulting polyester is discharged through a wide opening in the tubular reactor having a tapered structure. When the tubular reactor has a tapered structure, the aforesaid size of sectional shape is understood to refer to the size of an intermediate part of said tubular reactor.

4. Production Process

The monomers for polyester such as glycolic acid and glycolide are charged in the reactor. Usually and as desired, additives such as polymerization catalysts and molecular weight control agents are mixed with these monomers to prepare a mixture, which is then charged in the reactor. When the reactor used is in tubular form open at both ends, one opening is previously closed up with a rubber stopper, etc.

No particular limitation is imposed on how to charge the monomer, polymerization catalyst and molecular weight control agent in the reactor; however, it is preferable to melt blend or disperse the polymerization catalyst and/or molecular weight control agent in a monomer melt or solid before charging them into the reactor. In the case of the melt blending, temperature of the monomer melt is at least the melting point of polyester monomer, for example, preferably 85–200° C. more preferably 90–120° C.

The amount of the monomer to be charged into the reactor may be measured on a weight or volume basis; however, it is preferable to carry out measurement on a volumetric capacity basis, using more inexpensive, simpler equipment. To be specific, valves are mounted on the upper and lower portions of a measuring vessel. With the lower valve closed up, a monomer melt is admitted into the vessel by opening the upper valve until the vessel is filled to capacity. Then, the monomer melt is fed into the reactor by closing up the upper valve and opening the lower valve. If a plurality of measuring vessels are interconnected, it is easy to feed monomer melts to a plurality of reactors at the same time. The capacity of the measuring vessel may be on the same order as that of the reactor.

When a cyclic ester such as glycolide is subjected to ring-opening polymerization, all the openings may be closed up to create a closed system. When poly-condensation by dehydration or dealcoholization is carried out using glycolic acid or its alkyl ester, water or alcohol, etc. should be evacuated from the opening.

The reactor with the monomers or monomer mixture charged therein is heated from outside. No particular limitation is imposed on heating means; however, when the reactor is small, it is preferable to use a temperature-controllable oil bath in which the reactor is immersed for heating to a predetermined temperature.

Alternatively, the reactor with the monomers or monomer mixture charged therein may be heated with a jacket mounted on the outside thereof, in which a heat transfer oil is circulated. Yet alternatively, that reactor may be placed in a circulating hot-air oven or heated from outside using an electrical heater. For industrial production purposes, the reactor may remain fixed in place. Alternatively, the reactor with the monomers or monomer mixture charged therein may be transferred to an oil bath or a circulating hot-air oven, in which it may be held for a given period of time.

In the present invention, a polyester is prepared by bulk polymerization in the reactor. Then, the polyester is released from the inner surface of the reactor upon its volume shrinkage, whereby the polyester can be recovered in a bulky mass from the reactor.

To shrink the volume of the polyester product, it is preferably crystallized while it is in a molten or semi-molten state. In the present invention, it is preferred that the polyester such as polyglycolic acid be crystallized in a later stage of polymerization or after the completion of polymerization. The application of reaction conditions under which the polyester product is already crystallized at an initial stage of polymerization would not allow the polymerization reaction to proceed satisfactorily, often causing large amounts of unreacted materials (unreacted monomers) and low-molecular-weight materials (oligomer or low-molecular-weight polymer) to remain in the reactor. When the reaction temperature at the initial stage of polymerization is low, some heat may be applied at the later stage of polymerization so that the polyester product can be placed in a molten or semi-molten (amorphous) state.

It is here noted that by the initial stage of polymerization is intended a stage where the amount of the remaining unreacted materials is 50% or greater on a reaction start basis and by the later stage of polymerization a stage where the amount of the remaining unreacted materials is less than 50% on the same basis. To what degree the polymerization reaction proceeds may be determined by the gas or liquid chromatography or NMR (nuclear magnetic resonance) of the unreacted materials.

At the later stage of polymerization or after the completion of polymerization, the polyester product may be crystallized by carrying out the reaction at a temperature lower than the melting point or crystallization temperature of the polymer at the start time of polymerization or from the initial stage of polymerization; previously adding a crystal nucleating agent to the monomers; applying impacts on the polyester product; cooling the polyester product; or the like. In particular, the crystallization by carrying out the reaction at a temperature lower than the melting point or crystallization temperature of the polymer at the start time of polymerization or from the initial stage of polymerization, and the crystallization by cooling is preferred because it can be carried out in a stable, economical manner with no introduction of impurities. It is here noted that the cooling temperature should be lower than the melting point of the polyester.

As the volume of the polyester product such as polyglycolic acid is shrunk by crystallization or the like, the release of the polyester product from the releasable inner surface of the reactor becomes so ready that the polyester product can be easily recovered in the form of a bulky mass. The bulky mass is usually one single mass; however, it may be broken down into some mass pieces although depending on the polymerization conditions or post-treatment conditions used. It is here understood that the recovery of the polyester product as a bulky mass implies that it can be taken out of the reactor with no need of crushing polyester portions deposited onto the inner surface of the reactor, a stirrer, etc.

No particular limitation is imposed on how to discharge the resulting polyester from the reactor In a bulky form. For instance, this may be achieved by turning the reactor upside down; ejecting the polyester from one of both end portion of the reactor; and sucking the polyester from an upper opening in the reactor. Alternatively, a convex shape is imparted to a closing lid for the upper opening in the reactor, and a concave shape is forcibly imparted to the upper portion of a bulky form of polyester product. Then, a member having a high coefficient of friction with the polyester product is inserted into the concave portion, so that the polyester product is removed due to friction. Yet alternatively, a concave shape is imparted to the closing lid and a convex shape is forcibly imparted to the upper portion of the bulky polyester product, so that the convex portion of the product can be grabbed.

EXAMPLES

The present invention is now explained more specifically with reference to inventive and comparative examples.

Example 1

One hundred (100) grams of glycolide and 0.01 gram of tin dichloride.$2H_2O$ were charged into a stainless steel (SUS304) metal circular tube (reactor) of 24 mm in inner diameter and 350 mm in length, which tube was closed up at one opening with a silicone rubber stopper. Then, the other opening was closed up with a silicone rubber stopper. The said tube was immersed in an oil bath of 220° C. for ring-opening polymerization by heating.

Three hours later, the said tube was taken out of the oil bath, and left standing for cooling over 2 hours. Two hours later, the silicone rubber stoppers were put off and the said tube was placed in a vertical state where it was lightly shaken so that a bulky mass of polyglycolic acid of 100 grams was discharged (with the recovery yield=about 100%).

Example 2

One hundred (100) grams of glycolic acid were charged into a stainless steel (SUS304) metal circular tube (reactor) of 24 mm in inner diameter and 350 mm in length, which tube was closed up at one opening with a silicone rubber stopper. Then, the said tube was immersed in an oil bath of 220° C. with the stopper down. Dehydration under a reduced pressure of 20 to 50 mmHg was carried our through the other opening in the said tube. Two hours after the dehydration polycondensation was performed in this way, the distillation of condensed water was not found. Then, the application of the reduced pressure and the heating of the oil bath were stopped, followed by spontaneous cooling.

Two hours later, the said tube was taken out of the oil bath the temperature of which dropped to 100° C., and the silicone rubber stopper was put off. Then, the said tube was lightly shaken in a vertical state, so that a bulky mass of polyglycolic acid of 76 grams was discharged (with the recovery yield=about 100%).

Example 3

One hundred (100) grams of glycolide and 0.01 gram of tin dichloride.$2H_2O$ were charged into a stainless steel (SUS304), bottomed metal circular tube (reactor) of 24 mm in inner diameter and 300 mm in length, which tube had a taper gradient of 10%. Then, the said tube was closed up at an opening with a silicone rubber stopper. The said tube was immersed in an oil bath of 220° C. for ring-opening polymerization by heating.

Three hours later, the said tube was taken out of the oil bath and left standing for cooling over 2 hours. Two hours later, the silicone rubber stopper was put off, and the said tube was turned upside down, instantaneously whereupon a bulky mass of polyglycolic acid of 100 grams was discharged due to its own weight (with the recovery yield about 100%).

Example 4

One hundred (100) grams of glycolide and 0.01 gram of tin dichloride.$2H_2O$ were charged into a stainless steel (SUS304) metal circular tube (reactor) of 24 mm in inner diameter and 350 mm in length, which tube was closed up at one opening with a silicone rubber stopper and had been coated on its inner surface with a releasing agent ("Die-Free" made by Daikin Kogyo Co., Ltd.). Then, the other opening, also, was closed up with a silicone rubber stopper. The said tube was immersed in an oil bath of 220° C. for ring-opening polymerization by heating.

Three hours later, the said tube was taken out of the oil bath, and left standing for cooling over 2 hours. Two hours later, the silicone rubber stoppers were put off and the said tube was placed in a vertical state, instantaneously whereupon a bulky mass of polyglycolic acid of 100 grams was discharged (with the recovery yield=about 100%).

Example 5

Two thousands (2,000) grams of glycolide and 0.06 gram of tin dichloride.$2H_2O$ were melt-blended and then charged into a jacketed, stainless steel (SUS304) rectangular reactor (the dimensions of the upper opening: 300 mm in length and 30 mm in width dimension and the dimensions of the closed lower portion: 294 mm in length, 26 mm in width dimension and 200 mm in depth). Then, the opening was closed up with a stainless steel (SUS304) plate. While the inner surface of the reactor was not buffed, the reactor had a tapered structure extending linearly form the top of the opening to the bottom of the closed portion. The jacket structure was applied to the whole surface of the reactor except the upper opening. The ring-opening polymerization was carried out by forcibly circulating a heat transfer oil of 170° C. through the jacket. Seven (7) hours later, the heat transfer oil circulated through the jacket was cooled, thereby cooling the whole rectangular reactor. Then, the upper steel plate was put off and the rectangular reactor was turned upside down through 180°, instantaneously whereupon a bulky polyglycolic acid product of 2,000 grams was discharged (the recovery yield= about 100%).

Example 6

Four hundreds (400) grams of glycolide and 0.012 gram of tin dichloride.$2H_2O$ were melt-blended and then charged into a jacketed, stainless steel (SUS304) circular tube (reactor: 28 mm in inside diameter and 500 mm in length with the top opening and the bottom closed). Then, the upper opening was closed up with a stainless steel (SUS304) plate. While the said tube had no tapered structure, its inner surface was buffed (with buff No. 300). The jacket structure was applied to the whole surface of the reactor except the upper opening. The ring-opening polymerization was carried out by forcibly circulating a heat transfer oil of 170° C. through the jacket. Seven (7) hours later, the heat transfer oil circulated through the jacket was cooled, thereby cooling the whole said tube. Then, the upper steel plate was put off and the said tube was turned upside down through 180°, instantaneously whereupon a bulky mass of polyglycolic acid of 400 grams was discharged (the recovery yield=about 100%).

Example 7

Example 1 was repeated with the exception that 90 grams of glycolide, 10 grams of L-lactide and 0.01 gram of tin dichloride.2H$_2$O were used for a 5-hour polymerization. As a result, a bulky form of glycolide-lactide copolymer of 100 grams was discharged from the metal circular tube (the recovery yield=about 100%).

Example 8

Example 1 was repeated with the exception that 80 grams of glycolide, 20 grams of L-lactide and 0.01 gram of tin dichloride.2H$_2$O were used for a 5-hour polymerization. As a result, a bulky form of glycolide-lactide copolymer of 100 grams was discharged from the metal circular tube (the recovery yield=about 100%).

Example 9

Example 1 was repeated with the exception that 95 grams of glycolide, 5 grams of L-lactide and 0.003 gram of tin dichloride.2H$_2$O were used for a 24-hour polymerization at 170° C. After the completion of polymerization, the metal tube was removed out of the oil bath, immediately after which the silicone rubber stopper was put off with no cooling. As a result, a bulky form of glycolide-lactide copolymer of 100 grams was discharged from the metal circular tube (with the recovery yield=about 100%).

Example 10

Example 1 was repeated with the exception that 95 grams of glycolide, 5 grams of trimethylene carbonate and 0.003 gram of tin dichloride.2H$_2$O were used for a 7-hour polymerization at 170° C. After the completion of polymerization, the metal tube was removed out of the oil bath, immediately after which the silicone rubber stopper was put off with no cooling. As a result, a bulky form of glycolide-trimethylene carbonate copolymer of 100 grams was discharged from the metal circular tube (with the recovery yield=about 100%).

Comparative Example 1

One hundred (100) grams of glycolide and 0.01 gram of tin dichloride.2H$_2$O were charged into a bottomed glass test tube of 24 mm in inner diameter and 350 mm in length. Then, the test tube was closed up at an opening with a silicone rubber stopper. This test tube was immersed in an oil bath of 220° C. for ring-opening polymerization by heating.

Three hours later, the test tube was taken out of the oil bath and left standing for cooling over 2 hours. In the cooling process, the glass cracked noticeably, indicating that a part of the test tube was broken. Two hours later, the polyglycolic acid product was taken out of the test tube. It was found that glass fragments were stuck to the surface of a bulky mass of polyglycolic acid. The glass fragments stuck to the polyglycolic acid were ground off by a grinder. Consequently, the amount of the polyglycolic acid recovered was barely 85 grams (the recovery yield was about 85t by weight).

Comparative Example 2

One hundred (100) grams of glycolide and 0.01 gram of tin dichloride.2H$_2$O were charged into a stainless steel (SUS304) reactor equipped with a stirrer, wherein they were heated to 220° C. under agitation for ring-opening polymerization.

One hour later, the viscosity of the reaction system became rapidly too high for stirring. After cooling, the polyglycolic acid product fixed to the stirrer was recovered by means of a cold chisel, a chisel, a fretsaw or the like. As long as ten hours were needed for recovery with increased losses: the amount of the poly-glycolic acid recovered was barely 92 grams (the recovery yield was about 92%).

INDUSTRIAL APPLICABILITY

According to the present invention, there is provided a polyester production process by bulk polymerization in a reactor apparatus, which enables the resulting polyester to be readily recovered in the form of a bulky mass after the completion of polymerization reactions.

According to the present invention, it is thus possible to readily recover the resulting polyester from the reactor after bulk polymerization by making use of the volume shrinkage of the polyester and the releasability of the polyester from the inner surface of the reactor.

According to the present invention, there is also provided a reactor apparatus for bulk polymerization for polyesters, which is best suited for such a polyester production process.

What is claimed is:

1. A polyester production process by bulk polymerization in a reactor apparatus, characterized in that the volume of the resulting polyester is shrunk to release the same from the inner surface of the reactor, so that the polyester can be recovered in the form of a bulky mass from the reactor.

2. The production process according to claim 1, wherein the resulting polyester is crystallized to shrink its volume.

3. The production process according to claim 1, wherein the inner surface of the reactor is free from asperities that come into contact with the resulting polyester and disturb its discharge.

4. The production process according to claim 1, wherein there is no stirrer in the reactor.

5. The production process according to claim 1, wherein the reactor has at least its inner surface formed of a metal.

6. The production process according to claim 1, wherein the inner surface of the reactor has been treated with a releasing agent.

7. The production process according to claim 1, wherein the reactor is a tubular member.

8. The production process according to claim 7, wherein the reactor is a tubular member open at both ends, and at least one of the openings is closed up during a polymerization reaction.

9. The production process according to claim 7, wherein the reactor is a tubular member having a bottom and an opening.

10. The production process according to claim 7, wherein the tubular member has a tapered structure.

11. The production process according to claim 10, wherein the tapered structure has a gradient of 1 to 50%.

12. The production process according to claim 1, wherein the polyester is an aliphatic polyester.

13. The production process according to claim 12, wherein the aliphatic polyester is a polyhydroxycarboxylic acid.

14. The production process according to claim 13, wherein the polyhydroxycarboxylic acid is polyglycolic acid.

15. The production process according to claim 14, wherein the polyglycolic acid is a polymer obtained by the ring-opening of glycolide.

16. A reactor apparatus for bulk polymerization for polyesters, which is capable of being heated from outside and formed of a material having heat resistance enough to stand up to a bulk polymerization temperature for polyesters, and has an inner surface capable of releasing the resulting polyester upon its volume shrinkage.

17. The reactor according to claim 16, wherein the inner surface is free from asperities that come into contact with the resulting polyester and disturb its discharge.

18. The reactor according to claim 16, wherein there is no stirrer inside.

19. The reactor according to claim 16, which has at least its inner surface formed of a metal.

20. The reactor according to claim 16, which is a tubular member.

21. The reactor according to claim 20, which is a tubular member open at both ends, wherein at least one of the openings is closed up during a polymerization reaction.

22. The reactor according to claim 20, which is a tubular member having a bottom and an opening.

23. The reactor according to claim 20, which is a tubular member having a tapered structure.

24. The reactor according to claim 23, wherein the tapered structure has a gradient of 1 to 50%.

* * * * *